SINGLE-TUBE CONTROL CIRCUIT FOR HORIZONTAL AND VERTICAL DEFLECTING SYSTEMS OF A TELEVISION RECEIVER

Filed Feb. 2, 1950 2 Sheets-Sheet 1

INVENTORS
FRANCIS A. WISSEL
NORMAN W. PARKER
FRANK L. WEDIG
BY Alden D. Redfield
Charles M. Hogan
ATTORNEYS INVENTORS
FRANCIS A. WISSEL
NORMAN W. PARKER
FRANK L. WEDIG
BY Alden D. Redfield
Charles M. Hogan
ATTORNEYS

United States Patent Office 2,739,182

Patented Mar. 20, 1956

2,739,182

SINGLE-TUBE CONTROL CIRCUIT FOR HORIZONTAL AND VERTICAL DEFLECTING SYSTEMS OF A TELEVISION RECEIVER

Francis A. Wissel, Norman W. Parker, and Frank L. Wedig, Cincinnati, Ohio, assignors to Avco Manufacturing Corporation, Cincinnati, Ohio, a corporation of Delaware Application February 2, 1950, Serial No. 141,984

5 Claims. (Cl. 178—7.3)

The present invention relates to television receivers and specifically to a fundamentally novel circuit which utilizes a single electron tube to perform the functions of separating the synchronizing signals from the composite detected signal, providing separated vertical synchronizing pulse signals for controlling the vertical deflecting system and providing a unidirectional control potential for automatically governing the operating frequency of the horizontal deflecting system.

The discussion of the prior art is necessarily abbreviated because the literature and known public use do not show any single-tube circuit which is capable of performing these functions in a commercially adequate manner. It is customary to use at least one tube or equivalent for separating the composite vertical and horizontal synchronizing pulses from the detected video signal, and at least two other tubes or equivalent and differentiation and integration networks for amplifying the vertical and horizontal pulses and separating them the one from the other. At least one additional tube is employed in performing the automatic frequency control (AFC) function and developing a unidirectional potential suitable for controlling the operating frequency of the horizontal deflecting system. The invention is directed to a reduction in this large number of tubes.

In accordance with the invention shown in the copending patent application Serial No. 141,942 of Norman W. Parker, filed simultaneously herewith in the United States Patent Office, entitled "Automatic Frequency Control Circuit," now U. S. Patent No. 2,561,817, issued July 24, 1951, and assigned to the same assignee as the present application and invention, a plate-keyed AFC tube circuit has been developed. The present invention represents a utilization of certain principles set forth in the aforementioned Parker patent, together with other principles herein set forth.

It is an object of the present invention to provide a single tube having an input circuit which is coupled to the video channel and a pair of output circuits from one of which the automatic horizontal frequency control potential is obtained and from the other of which separated vertical synchronizing pulses of sufficient amplitude to control the vertical deflection system are obtained. Broadly stated, the principal object of the present invention is to provide a single tube stage which replaces the plurality of tubes hereinbefore employed for the separation and amplification of synchronizing signals and for the development of the AFC potential.

Stated in a different manner, a basic object of the invention is to provide a single tube stage which so intercouples the video channel and the horizontal and vertical deflecting systems that it completely controls the operation of both systems and at the same time realizes the known advantages of indirect synchronization control of the horizontal deflecting system.

Another fundamental object of the present invention is to provide a relatively simple, very effective, and novel circuit arrangement for isolating the horizontal and vertical deflecting systems from each other in such a manner that coupling between the horizontal and vertical oscillators is minimized. This isolation is accomplished in accordance with the present invention by utilizing principles which have heretofore not been applied to separation and control functions and by exploiting these principles in a very simple and economical manner.

For a better understanding of the present invention, together with other and further advantages, objects and capabilities thereof, reference is made to the following description of the accompanying drawings, in which there is disclosed a television receiver circuit including an illustrative embodiment of synchronizing signal separator and control circuit in accordance with the present invention.

Figure 7:
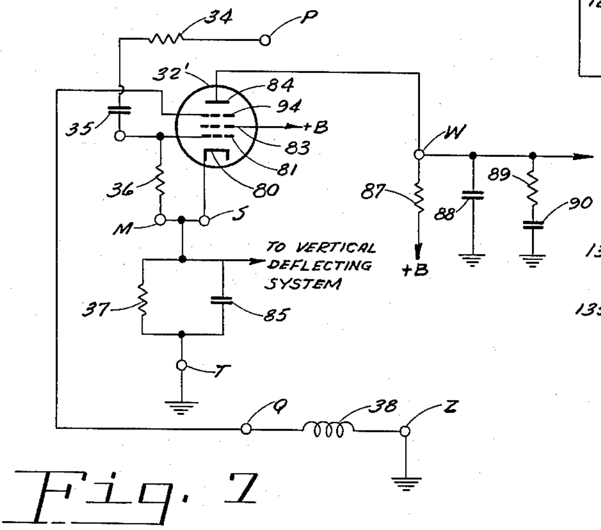
Figure 8:
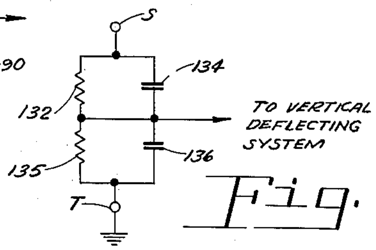

Fig. 7 is another modified form of the invention in which plate current pulses are initiated by keying pulses applied to the suppressor electrode; and Fig. 8 is still another modified form of the invention in which the sensitivity of the horizontal AFC potential developing circuit is reduced during the time of the vertical sync pulses in order to minimize apparent misinformation received at those times.

For the purpose of fixing primary attention on the features which are provided in accordance with the present invention, there follows a paraphrased form of one of the original claims appended hereto, with reference numerals parenthetically furnished. In accordance with that claim to the invention, we provide:

In a television receiver of the type which includes a source (10—14, output of 16) of positive-polarity composite video and horizontal and vertical pulse signals, a directly synchronized vertical deflecting system 86 and an indirectly synchronized horizontal deflecting system 41 of the type which is controlled by a unidirectional frequency-control potential, a circuit 40 for separating the synchronizing pulses from the composite signals and for developing the unidirectional (AFC) control potential comprising, in combination: an electronic tube 32 having at least a cathode 80, a control electrode 81, a screen grid 83 and an anode 84, means 34, 35, 36 for applying said composite signals to the control electrode circuit of said tube including grid-biasing means 36, 35 for confining cathode current conductivity of said tube 32 during broadcast reception to the periods of said synchronizing pulses, an integrating circuit comprising a parallel combination of a resistor 37 and a capacitor 85 in the cathode circuit of said tube for stripping the vertical synchronizing pulses by integration of cathode current, means 100 for applying said vertical synchronizing pulses to the vertical deflecting system, means for supplying potential to the screen to cooperate with the grid bias to cause cathode current to flow only during the application of said synchronizing pulses to said control electrode in an amount substantially independent of applied anode voltage, means 38 coupled to the horizontal deflecting system for applying retrace pulses to the anode 84 circuit of said tube 32 to produce pulses of plate current by diversion of some of the cathode current from screen to anode during periods of coincidence between said retrace pulses and the horizontal synchronizing components of said composite signals, means 87, 88 for integrating said plate-current pulses into said desired unidirectional control potential, and means 92, 93 for applying said control potential to said horizontal deflecting system.

Our combined synchronizing signal separator and automatic frequency control system is shown as incorporated in a television receiver which may be regarded as conventional for the purposes of this case except in the respects hereinafter pointed out. This illustrative receiver comprises a radio amplifier stage 10 to which the input carrier signals are applied, and the following stages in cascade therewith: an oscillator-modulator 11 for converting the received carrier signals to intermediate frequency signals (it being understood that the units 10 and 11 are tunable to select a desired television broadcast channel), first and second intermediate frequency amplifying stages 12, third and fourth intermediate frequency amplifying stages 13, a video detector stage 14, and an output unit symbolically shown within the dashed outline 15. This receiver is of the intercarrier sound type, as generally shown and described in U. S. Patent No. 2,448,908 to Parker, and it will be understood that further amplification of the composite video signals occurs within the output unit 15, which includes a video amplifier stage 16 and conventional circuitry for coupling that stage to the input circuit of a cathode ray picture tube 17.

The elements collectively indicated within the dashed outline 15 are purely conventional, as are likewise the units 10, 11, 12, 13 and 14, so that further description thereof is deemed unnecessary herein. Briefly, however, the detector output is coupled to the control electrode of video amplifier tube 16 by an appropriate network (included within the block 14 and not shown). Amplifier tube 16 has a grounded cathode, and its screen is connected to an appropriate source of space current (not shown) indicated by the symbol +B, as by a resistor 18, R. F. by-passed by a capacitor 19. The anode of tube 16 is coupled through a peaking coil 20 and a resonant circuit (comprising a parallel combination of an inductor 21 and a capacitor 22) and a coupling circuit (comprising a parallel combination of a capacitor 23 and a coupling resistor 24) to the cathode of a cathode ray picture tube 17. The anode of the video amplifier has a load comprising, in addition to the series peaking inductor and the above-mentioned resonant circuit, a series combination of an inductor 25 and a resistor 26 connected to a source of space current +B (not shown).

In order to facilitate the description of various modified forms of the present invention, such terminals as X and Y at the leads of resistor 26 are herein shown. In the description of some of the alternative constructions hereinbelow set forth, it will be understood that alternative elements bearing the reference letters X and Y at their terminals may be substituted for the resistor herein shown, for example.

The cathode of the picture tube is normally positively biased from an appropriate source of space current (indicated by the symbol +B and not shown) through a series network comprising a combination of resistors 27 and 28, resistor 28 being connected between the picture tube cathode and ground. The grid is normally biased less positively than the cathode (and therefore negatively relative to the cathode) by a circuit comprising a shunt filter capacitor 29 and a potentiometer 30 having a sliding contact 31 connected to the grid, the terminals of the resistor body being connected between the source of positive potential +B and ground.

The use of the expression +B herein should be deemed to apply to the positive terminal of any appropriate source of space current, and the reference letter is not necessarily always used to designate the same or a common source, since the choice of appropriate anode potentials is well known to those skilled in the art, so that it is not necessary specifically to describe such sources herein.

The units 11, 12, 13, 14 and part of 15 are herein briefly described as to function, in that they comprise a source of composite video, horizontal synchronizing and vertical synchronizing signals. The signal output of the video amplifier stage is connected to the input circuit of our novel combined synchronizing signal separator and AFC potential control tube 32 by a network comprising a conductor 33, a series resistor 34, a capacitor 35, and resistance to ground made up of a resistor 36 (between grid and cathode of tube 32) and a resistor 37 (between cathode of tube 32 and ground).

The anode circuit of control tube 32 is periodically keyed into conductivity (i. e. current is periodically diverted from the screen to the anode) by deflection-rate pulses which occur during the retrace intervals and are applied to the anode. These pulses are obtained from a winding 38 which is included in the horizontal output transformer assembly, shown within the rectangular dashed outline 39. The manner in which the retrace pulses are developed will be explained in some detail. It will be understood that one of the ultimate functions of our novel circuit, included within the dashed outline 40, is to apply to the horizontal deflecting system (shown within the dashed outline 41) a direct current control potential of such a magnitude as to maintain synchronism (i. e. a predetermined desired phase relationship between the synchronizing signals and the flyback pulses).

The horizontal deflecting system which is shown within the dashed outline 41 is conventional and need not be described in detail herein. Briefly, however, unit 41 comprises the following principal components: a blocking-oscillator and discharge tube 42, a power output tube 43, a primary 44 and a secondary 45 of an output transformer, a damping tube 46, and the horizontal deflecting coils 47, 48.

The blocking oscillator circuit comprises a triode 42, an autotransformer or inductor 49, arranged in a series combination with a capacitor 50 coupled between plate and grid, and a discharge capacitor 51 effectively connected between a tap 52 on the auto-transformer and ground. A resonant circuit comprising a parallel combination of an inductor 53, a capacitor 54 and a damping resistor 55 is interposed between this tap and the high potential terminal of capacitor 51. Plate voltage is supplied to the blocking oscillator through a circuit comprising conductor 60, dropping resistor 61, tap 52, and a part of transformer 49. The sawtooth voltages are developed for horizontal deflection across discharge capacitor 51, the tube 42 functioning not only as a blocking oscillator tube but also as a discharge tube. The blocking rate or frequency of oscillation of tube 42 is controlled by causing the discharge of capacitor 50 to reach the cut-off point at a variable time controlled by the AFC potential output of unit 40.

The discharge capacitor 51 is coupled, as by a capacitor 63 and a grid resistor 64, to the grid of a horizontal output amplifier tube 43, the latter being provided with a cathode resistor 65, by-passed by a capacitor 66. The output of this amplifier stage is coupled by a transformer network 44, 45, to the deflecting coils 47, 48, and the current waves appearing in the plate circuit of this amplifier tube 43 are employed to produce periodically recurring saw-tooth currents of line frequency in those coils, thereby to deflect the electronic beam in the picture tube at line-frequency.

The system intercoupling the horizontal output tube and the deflection yoke will be understood by reference to the following patents and publications: Kiver, Television Simplified, pages 207–213, second edition, 1948, D. Van Nostrand, Inc., New York; U. S. Patent No. 2,440,418, Tourshou. Reference to those publications is made for a detailed description of the network. Briefly, the primary 44 of the horizontal output transformer is magnetically coupled to a secondary 45 comprising series portions 67, 68 of which portion 68 is coupled across the horizontal deflecting coils of the yoke circuit. These coils form part of a yoke assembly (not shown) encircling the neck of the cathode ray image reproducing tube 17.

The voltage variations applied to the control electrode of power tube 43 produce a rising plate current in this tube during scansion, which current is cut off at the beginning of retrace time. The current in the deflection coils and the horizontal output transformer does not disappear at the instant of cut-off of tube 43, however, due to the inherent distributed capacity of the circuit. The inductance of these coils and the transformer, together with the above-mentioned distributed capacity, forms a tuned circuit in which high frequency oscillations would normally be produced. These oscillations begin with the start of retrace time and continue for one-half of the normal period of oscillation, the oscillation being stopped at the negative current peak by a series combination of a diode 46 and a capacitor 69 connected across the secondary. The polarities immediately following retrace are such that damper tube 46 conducts and continues to conduct until tube 43 again becomes conductive. The voltage developed across capacitor 69 is such as to increase or boost the voltage of the D. C. power source (not shown), connected to terminal 70. It will be noted that the anode potential supply for tube 42 is completed to this terminal 70 through a circuit comprising resistor 71 and line 60.

The primary winding of the horizontal output transformer is connected to a capacitor 73 in such a manner that a varying voltage is developed across capacitor 73, which voltage is applied to capacitor 69 through an inductor 74 for purposes of linearity control, as explained in the afore-mentioned Tourshou patent. It will be understood that tube 43 receives its anode supply voltage through primary 44.

When the quick collapse of plate current through tube 43 occurs, at the end of trace, there is produced across winding 38, by reason of self-induction, a high voltage pulse. One of these pulses occurs during each retrace interval. They are known as "flyback pulses" or retrace pulses and they occur at line-deflection rate.

The elements beginning with reference number 42 and ending with the reference numeral 74 are herein shown for the purpose of disclosing an illustrative source of flyback or keying or retrace or deflection-rate pulses employed in the control system provided in accordance with the invention. The retrace pulse source shown within the dashed outline 41 is illustrative and other arrangements for deriving deflection-rate or retrace pulses from the horizontal deflecting system may be employed within the scope of the claims appended hereto.

Our novel circuit takes advantage of a certain principle explained in the aforementioned Parker Patent No. 2,561,817: developing the horizontal AFC potential by grid gating during sync pulse periods and plate keying during retrace. Parker Patent No. 2,561,817 presupposes the application of stripped synchronizing signal components. The present invention utilizes additional principles in order to eliminate separate synchronizing signal separation stages.

The primary objective to which the invention is addressed is the providing of a single tube for performing the function of sync signal separation, direct vertical control and indirect horizontal (AFC) control, and at the same time effectively isolating the horizontal and vertical control systems. We have appreciated that the known pentode synchronizing separator circuit, which normally has differentiating and integrating networks in its plate circuit for performing the inter-sync separating functions, provides effective separation of both synchronizing pulses from the composite input signals. We have appreciated that a screen grid tube functions in such a manner that its plate circuit can be made to perform the same function in developing AFC potential as the plate circuit of the control tube shown in the aforementioned Patent No. 2,561,817, while at the same time the isolation of the plate circuit from the grid circuit is such that the sync separation function can be performed in the grid circuit without interference between the separate functions. We have also appreciated, in approaching this objective, that the cathode circuit of this tube may be employed to derive vertical synchronizing information.

Figure 1:
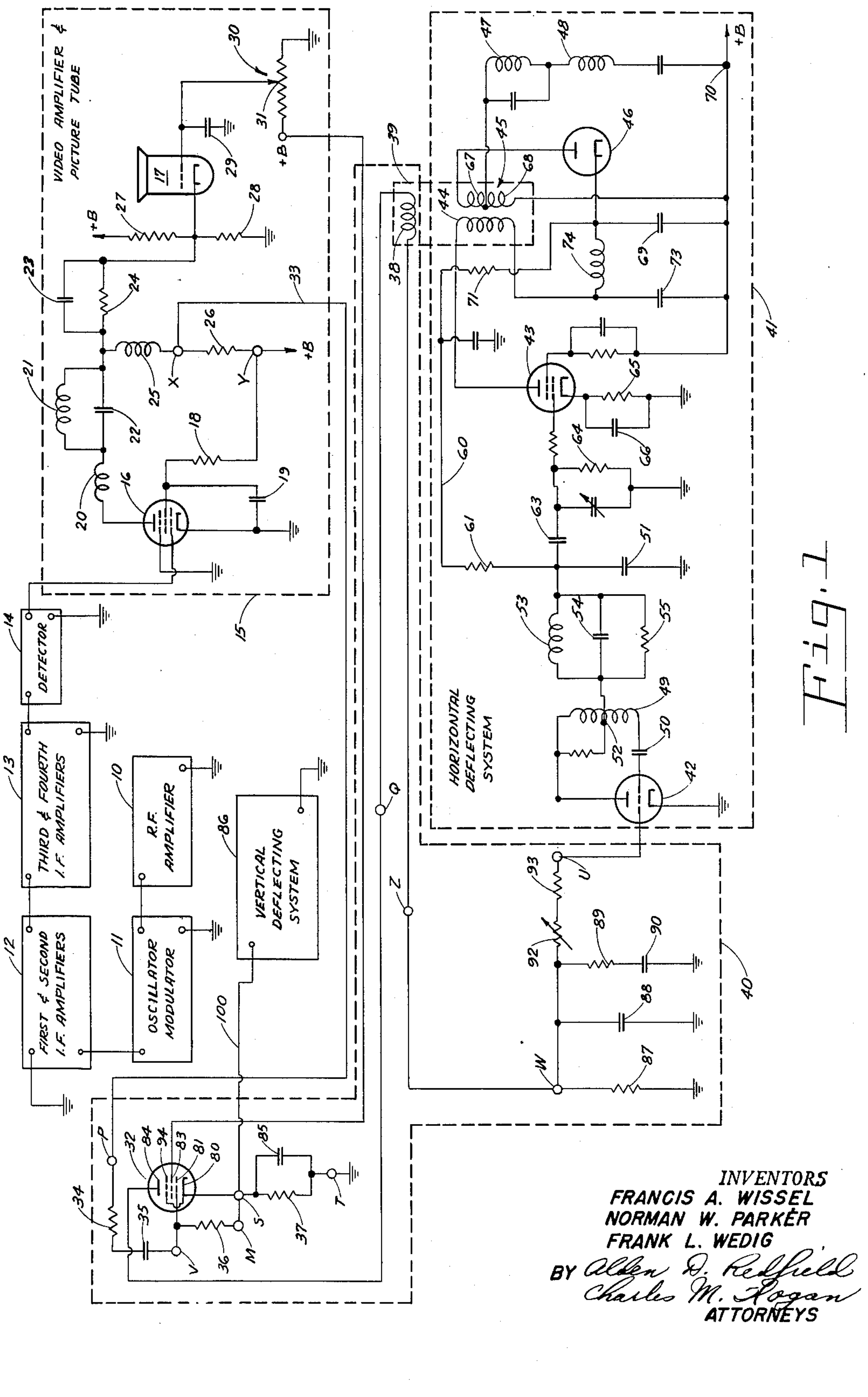
Fig. 1 is a circuit schematic of a television receiver including a combined synchronizing signal separator and AFC control-potential-developing circuit in accordance with the invention.

In accomplishing the objects of the invention in the illustrative embodiment shown in Fig. 1, we provide, for the performance of those functions, a pentode 32, having a cathode 80, a control electrode or grid 81, a screen electrode or grid 83, a plate or anode 84, and a suppressor grid 94, the latter being here shown as connected to the cathode. The screen grid is operated at a relatively stable positive potential by connection to the source +B (not shown). The grids 83 and 94, particularly the screen grid 83, provide electrostatic shielding which substantially eliminates capacity coupling between the plate 84 and the control electrode 81. Additionally, a pentode can be so operated that the magnitude of space current is not substantially affected by the anode potential, in that the screen grid so isolates the plate from the grid that the number of electrons drawn away from the space charge is substantially independent of the plate voltage. Terman, Radio Engineering, McGraw-Hill Book Company, Inc., second edition, 1937, p. 129, states that the total space current of a pentode, while dependent on the control grid and screen grid potentials, is not substantially affected by plate voltage when the plate voltage is sufficiently large that no virtual cathode is formed. The total space current tends to be independent of plate voltage, and it varies with control grid potential. We so operate tube 32 that space current is confined to the periods of the horizontal and vertical synchronizing components. This means that electrons flow to screen 83 only when synchronizing pulse components of positive polarity are applied to grid 81. When no voltage is applied to anode 84 the anode circuit is not passing current at all. However, when a retrace pulse is applied to anode 84, although the total space current does not substantially change, some of the space current is diverted from the screen 83 to the plate 84, and the plate circuit then passes current. In accordance with the invention, we utilize these advantages for the first time in isolating the horizontal and vertical deflecting systems. The generation of control pulses in the anode circuit does not affect the sync amplitude separation function in the control electrode circuit for two reasons: (1) the diversion of current from screen to plate does not substantially affect the total space current; (2) the plate is electrostatically shielded from the grid.

The term "space current" as herein employed is intended to designate the sum of the current passing from the cathode of tube 32 to the screen grid and the current which passes from the cathode to the anode. The term "cathode current" as used herein is intended to designate the sum of space current plus grid current, or total emission current. The terms "anode current" or "plate current" designate electron flow through anode 84. The term "screen current" designates electron flow through screen 83.

In the immediately following portion of the description of tube 32 and its associated circuits, primary emphasis is directed to the functioning of the tube effectively as a triode sync clipper for purposes of amplitude-separating the synchronizing signals from the composite signals. It will be parenthetically observed that the same tube functions as a plate-keyed, grid-gated amplifier tube for horizontal AFC control potential developing purposes. The tube is grid biased during actual television signal reception and has such a stable screen potential applied to it that space current flows only during the synchronizing signal portions of the composite signal applied to the control electrode. The composite signal is so poled that the synchronizing signals represent their maximum positive amplitude. Negative bias for the control electrode 81 (which for purposes of grid rectification may be likened to a diode plate) is developed across coupling capacitor 35 due to peak rectifying action. The discharge time constant of the grid bias network is determined by the parameters of capacitor 35 and grid resistor 36, the latter being connected between grid 81 and cathode 80. The control electrode circuit functions as a negative clamping circuit so that the peaks of the synchronizing pulses are effectively clamped at cathode potential and so that all portions of the composite signal below the superimposed synchronizing pulse level are cut off (those portions including video and pedestal), the composite signal being presented with such amplitude as to effect this operation. Since the flow of cathode current is permitted only during the periods of the synchronizing pulses, the latter are occasionally referred to herein as "gating" pulses.

The space current gated in this manner flows substantially entirely to the screen electrode 83 except during the portion of each retrace pulse which coincides with a gating period. During the intervals of coincidence, space current is diverted to the plate circuit.

It will be understood that space current flow in tube 32 is confined to the times when synchronizing pulses are applied to the control electrode, under conditions of actual reception of television signals. The description of the operation of tube 32 as given herein assumes the application of a composite television signal to the control electrode in the proper polarity and further assumes actual practical broadcast reception. Under those conditions control grid bias is developed. It will be understood that in the absence of a signal there is a steady D. C. component of screen current, no grid bias being developed under such conditions. However, this operating condition is not assumed in the description of the operation of this invention.

The cathode current pulses are applied to an integrating network comprising a parallel combination of a capacitor 85 and a resistor 37, connected between cathode 80 and ground, this network functioning in a well-understood manner to convert the increasing energy during the vertical synchronizing signal period into a voltage pulse which is applied to the vertical deflecting system 86 in a known manner and utilized to control its action by direct triggering.

The integrating circuit 37, 85 has a time constant which is long compared with the duration of the horizontal pulse components but not with respect to the vertical pulse components. Therefore, the capacitor 85 can charge by only a small amount for the short period of each horizontal pulse. The interval between horizontal pulses is so much longer than the horizontal pulse period that capacitor 85 has time to discharge substantially down to zero between these pulses. It is recognized that the equalizing pulses supply energy at half line intervals, but since their duration is also one-half of the horizontal pulse width they have the same duty cycle and do not cause the capacitor 85 to change voltage. When the vertical pulse is applied, however, the integrated voltage across capacitor 85 builds up to amplitude value required for triggering the vertical deflecting system, indicated by the block form 86.

As stated in Grob, Basic Television—Principles and Servicing, first edition, McGraw-Hill Book Company, Inc., New York, 1949, at page 282, "The integrated voltage across the condenser builds up to reach its maximum amplitude at the end of the vertical pulse and then declines practically to zero for the equalizing pulses and horizontal pulses that follow, producing a pulse of the triangular wave shape . . . . for the complete vertical synchronizing pulse. The pulses are repeated at the field frequency of 60 per second. Therefore, the integrated output voltage across the condenser can be coupled to the vertical scanning generator to hold the vertical synchronization."

Since a function of our novel circuit is to provide the unidirectional control potential which is applied to the horizontal deflecting system 41, specifically to the control electrode of blocking oscillator tube 42, we provide means including a winding 38 in the transformer unit 39 for applying to the anode-cathode circuit 80—84 of the tube 32 fly-back pulses of positive polarity. These pulses are developed during the beam retrace intervals, which occur at line frequency. These pulses do not key the tube 32 into space current conductivity. The space current conductivity keying is accomplished by gating action of the synchronizing pulse components. The fly-back pulses key the anode circuit into conductivity in the sense that they periodically cause some of the space current to be diverted from the screen grid circuit to the anode circuit. It has been already stated that the tube 32 is normally biased to space current cut-off (which of course includes anode current cut-off) in the absence of the synchronizing pulses. No current appears in the anode circuit unless two conditions are fulfilled: (1) space current flow must be permitted by the presence of synchronizing pulses; (2) anode current flow must be caused by the application of fly-back pulses. Therefore, current flow in the anode circuit of the tube 32 is confined to intervals of coincidence between synchronizing pulses and fly-back pulses. The anode circuit of tube 32 so operates as to generate periodic control pulses, the energy content or width or duration of which varies in accordance with the relative phases of the horizontal synchronizing pulses and the fly-back pulses. These control pulses are integrated by a network comprising a parallel combination of a resistor 87 and a capacitor 88 to produce the control potential, which is fed to the horizontal deflecting system 41 to control and synchronize the same. It will be observed that the anode circuit of tube 32 comprises, in series, anode 84, secondary 38, and the integrating circuit 87, 88.

Winding portion 38, being magnetically coupled to primary 44 and secondary 45, serves as the immediate source of positive fly-back pulses (developed during retrace) of line frequency which periodically key the anode circuit into conductivity. Tube 32 plate-rectifies into the time-constant integrating network comprising resistor 87 and capacitor 88.

The time constant of the network 87, 88 must be long compared to the interval between fly-back pulses. This network functions as a low pass filter which preferably should pass frequencies on the order of 30 cycles or less. Connected across the integrating network is a series combination of a resistor 89 and a capacitor 90, which functions as an anti-hunting network. The theory of anti-hunting networks is well known to the art and need not be further discussed herein. Such a network may be regarded as an error-rate circuit—columns 2 and 3, p. 60, Radio and Television News, January 1950, vol. 43, No. 1, published by Ziff-Davis Publishing Company, 185 North Wabash Avenue, Chicago 1, Illinois.

In the aforementioned Parker Patent No. 2,561,817, there is shown an AFC system in which the horizontal system control pulses are produced by keying the plate circuit of a tube into conductivity. The elements 84, 38, 87, 88, 89 and 90 herein disclosed are similar to the corresponding elements shown in that patent, and the plate circuit herein is also keyed into conductivity by fly-back pulses. However, when the plate circuit of our Fig. 1 is so keyed, electron flow is diverted from the screen grid circuit to the anode circuit, and that feature represents another distinction from said Parker Patent No. 2,561,817.

In this specific embodiment, the blocking oscillator 42 has a free-running frequency which is greater than that of the horizontal synchronizing pulses, i. e., greater than line frequency. In the absence of an AFC output from unit 40, in other words, the blocking oscillator would tend to run at a more rapid rate than deflection rate. A negative control potential is therefore employed to effect synchronism, and the condition necessary to accomplish this result in this illustrative case is that the initiation of the retrace pulse as applied to anode 84 occurs at or later than the initiation of the horizontal synchronizing pulse component, for reasons explained in the aforementioned Parker Patent No. 2,561,817, to which reference is accordingly made. The output plate current pulse of tube 32 has a total energy content or width or duration which is dependent on the above-mentioned interval of coincidence. Therefore, this plate current pulse is a measure of the corrective potential which is required as applied to blocking oscillator tube 42 to restore the desired phase relationship between order and response or between the horizontal synchronizing pulses and the horizontal fly-back pulses.

The direct current potential which is applied to the grid circuit of tube 42, through variable resistance 92 and 93, as shown, is obtained by integrating or averaging a large number of plate current pulses, this function being performed by the integrating network 87, 88, into which tube 32 plate-rectifies. The function of the integrating network is to convert a plurality of such pulses into a relatively steady control potential. Since the AFC potential is obtained in a manner bearing some points of similarity to that described in the aforementioned Parker Patent No. 2,561,817, some of the same important advantages are realized: (1) indirect synchronism and the immunity to noise which characterizes horizontal AFC circuits which are energy responsive rather than amplitude responsive; (2) plate circuit conductivity only during intervals of coincidence, so that there is immunity from noise during other periods; (3) high gain with respect to the generation of the AFC potential and dispensing with a direct current amplifier.

It will of course be understood that it is within the spirit of the present invention and the claims appended hereto to employ any type of deflection generator, and the invention is not limited to utility with a blocking oscillator such as that indicated by the reference numeral 42, but it may be used with any deflection signal generator of the type which is controlled as to frequency by a direct current potential; for example, a multivibrator.

In the illustrative example shown, a 6AU6 type of tube is employed as the element 32, the characteristics of that tube indicating a negligible change in space current with changes in plate voltage.

As indicated, a significant advantage of this circuit is a minimum of coupling between the horizontal sweep oscillator and vertical synchronizing signals. Another advantage resides in the fact that the low plate to grid capacity of a screen grid tube, together with the plate keying operation, prevents the introduction of picture information into the horizontal deflection system and vice versa.

We realize other advantages by using the grid circuit elements of tube 32, inclusive of the cathode 80 and the control electrode 81, and associated elements 34, 35, 36, and 37, as a negative clamping circuit for effectively clamping the peaks of the applied synchronizing pulses to the cathode potential level.

Assuming application of the keying pulses to the plate, the tube 32 is biased to cut-off at a level preferably slightly above the pedestal height and below the peaks of the superimposed synchronizing pulse signals. When a synchronizing signal pulse is applied to tube 32 the grid attempts to swing positive, but grid current flows through the resistor 36 developing a voltage drop of such polarity as to oppose the positive input voltage. Since the full input voltage is the sum of the drop across resistor 34 and the drop across the grid-cathode resistance, the larger this resistor is with respect to the grid-cathode resistance, the more nearly the voltage on the grid is limited to that of the cathode. This drop across resistor 34 is considered as an automatic bias developed during the synchronizing signal pulse periods.

The grid circuit of tube 32 causes the tube to function not only as an amplifier but also as a limiter, so that two significant advantages accrue: First, our AFC circuit is not dependent on a critical predetermined amplitude of the applied synchronizing pulses, since it performs its own limiting functions; second, our AFC circuit, as herein shown in detail, possesses a degree of immunity to "black noise" superimposed on the synchronizing signal pulses, such noise pulses being reduced by the limiting action.

The control pulses appearing in the anode circuit of tube 32 are truly dependent on the intervals of coincidence between the horizontal synchronizing pulses and the retrace pulses, and they are not critically dependent on the amplitude of the synchronizing pulses. For this reason, a serious disadvantage which has heretofore characterized other systems of AFC control is eliminated.

Another advantage of the present invention resides in the fact that the impedance of the cathode circuit (between cathode 80 and ground and inclusive of the relatively large capacitor 85 as a parameter) is small with respect to the effective impedance between cathode 80 and grid 81 (inclusive of the inherent grid-cathode capacitance as a parameter) even at the highest video frequency. These two impedances function effectively as a voltage divider, the small impedance portion of which is across the cathode load, so that any picture information which may tend to be coupled into the cathode load by the cathode-grid inherent capacity is negligible.

While we do not desire to be limited to any specific circuit parameters, such parameters varying in accordance with the requirements of individual designs, the following circuit values have been found entirely satisfactory in one successful embodiment of the invention in accordance with Fig. 1:

| | | |
|---|---|---|
| Tube 32 | | 6AU6 |
| Resistor 34 | ohms | 6800 |
| Capacitor 35 | microfarads | 0.1 |
| Resistor 36 | ohms | 560,000 |
| Resistor 37 | do | 1000 |
| Capacitor 85 | microfarads | 0.1 |
| Resistor 87 | ohms | 82,000 |
| Capacitor 88 | microfarads | 0.01 |
| Resistor 89 | ohms | 10,000 |
| Capacitor 90 | microfarads | 0.25 |
| Resistor 92 | ohms | 50,000 |
| Resistor 93 | do | 470,000 |
| Voltage applied of screen 83 | volts | 120 |
| Peak voltage to retrace pulse applied to anode 84 | do | 70 |

Figure 2:
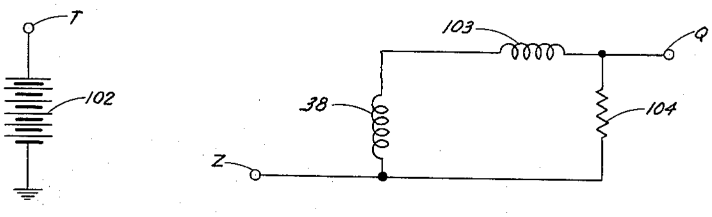
Fig. 2 is a circuit schematic of a modified form of the invention incorporating circuit features by which the pulses employed for anode-keying purposes are delayed.

In a modified form of the invention in accordance with Fig. 2, the plate-keying pulses are delayed relative to the actual retrace pulses. This is accomplished by two distinct features, either of which effectively and independently accomplishes some delay and could be designed to produce adequate delay, and both of which accomplished more delay than either alone.

A bias source, here shown as a battery 102 (Fig. 2) is inserted between terminal T (Fig. 1) and ground. This battery has its positive terminal on the cathode side and its negative terminal connected to ground. It does not affect grid bias relative to cathode because both grid and cathode are connected directly or indirectly to terminal S. This battery biases the cathode positively relative to the anode and in effect biases the anode negatively relative to the cathode. The leading-edge of the positive plate keying-pulse wave form has a rising slope. The voltage supplied by battery 102 being so poled as to oppose the plate keying pulse, the time at which the leading edge of the plate pulse keys the anode circuit of tube 32 into conductivity is delayed. This feature is referred to as "voltage delay."

Continuing with the Fig. 2 embodiment, we substitute for the winding 38, shown between terminals Q and Z (Fig. 1) the combination of a winding 38 and a time-delay network comprising an inductor 103 and a resistor 104, the winding 38 and the inductor 103 (Fig. 2) being in series between terminals Z and Q (Fig. 1) and the resistor 104 being connected across the series combination. This feature is referred to as "coil delay."

The operation of the illustrative delay network 103, 104 and voltage delay bias of Fig. 2 will become apparent in the light of the following discussion: (1) It will be understood that the length of any given blanking period is predetermined and fixed by the standards of the Federal Communications Commission; (2) when the horizontal system is in synchronism, there is normally a time delay between the initiation of the blanking signal and the initiation of the line-frequency synchronizing pulses. Therefore, in the absence of the delay network, there would be a considerable lag between the leading edge of the blanking pulse and the following initiation of line retrace. It is necessary to complete line retrace before the end of the blanking interval, and it is desirable to utilize more of the blanking interval for sweep retrace than that which is utilized in the absence of the delay features.

The inherent characteristics of the AFC system as hereinabove described, neglecting for the moment the delay network, are such as to establish, as a necessary condition for operation, a limited range of phase displacement between the initiation of retrace and the initiation of the plate-keying pulses. The delay network affords such control that the initiation of the plate-keying pulse can be made to occur at an optimum time following the initiation of retrace. This is a desirable feature which permits relatively wider latitude in the design of horizontal deflection circuits.

We effectively phase-advance the initiation of line retrace relative to the initiation of the plate-keying pulse by delaying the keying pulse in the delay network. The mere fact that the plate keying pulse is delayed relative to retrace does not in any way alter the predetermined phase relationship at synchronism between the plate keying pulse and the received synchronizing pulse, which latter is established by the predetermined developed AFC potential. The system thus so operates as to bring the delayed keying pulse into average synchronism with the input synchronizing pulse. But since retrace time is effectively phase-advanced with respect to the plate keying pulse, it follows that retrace time is phase advanced with respect to the initiation of the blanking interval. Therefore, the circuitry of Fig. 2 permits the utilization of more of the blanking interval during the retrace period and effectively prevents picture folding. It will be understood that by, in effect, phase-advancing the initiation of retrace relative to the initiation of the plate keying pulse, we advance the average beginning of line retrace relative to the received synchronizing pulse, and the blanking pulse. Thus, we cause a larger portion of retrace to occur during the blanking period.

It will be understood that any suitable artificial delay network can be substituted for the elements 103 and 104, and that the elements 103 and 104 can be made variable to vary the plate keying-pulse by the optimum amount. Suitable parameters are:

| | | |
|---|---|---|
| Resistor **104** | ohms | 10,000 |
| Coil **103** | millihenries | 20 |

Figure 3:
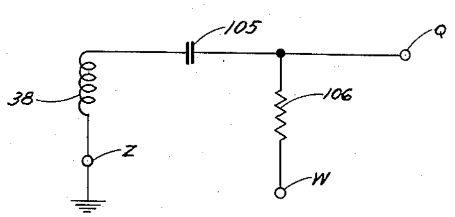
Fig. 3 is a circuit schematic showing a modified form of coupling network for applying retrace pulses to the control tube anode circuit.

In Fig. 3 there is shown a modified form of circuit for applying keying pulses to anode 84. Terminal Z (Fig. 1) may be connected to ground (Fig. 3) instead of to terminal W. Interposed between winding 38 and terminal Q is a coupling capacitor 105 (Fig. 3). A resistor 106 is connected between terminal W and terminal Q, which is directly connected to plate 84. In this shunt-feed plate-supply circuit tube 32 plate rectifies into the integrating circuit 87, 88, and keying pulses are applied to anode 84 from winding 38 through capacitor 105. Suitable parameters are:

| | | |
|---|---|---|
| Capacitor **105** | micromicrofarads | 100 |
| Resistor **106** | ohms | 10,000 |

The circuits illustrated in Figs. 2 and 3 are disclosed and claimed in U. S. Patent 2,545,346 to Edelsohn and U. S. Patent 2,632,050 to Parker.

Figure 4:
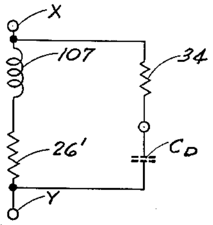
Fig. 4 is a circuit schematic showing a portion of an alternative form of video amplifier output circuit which may be used in conjunction with the invention.

In Fig. 4 is shown a series combination of an inductor 107 and resistor 26' which may be placed between terminals X and Y of the video amplifier output circuit, in lieu of resistor 26. The Fig. 4 circuit is disclosed and claimed in U. S. Patent 2,630,050 to Wissel. This circuit takes advantage of the known fact that a two-branch combination, one branch of which includes an inductance and a resistance in series and the other branch of which includes capacitance and resistance, can be made frequency independent in the sense that such a circuit can be made to "look like" substantially a pure resistance at all input frequencies. Specifically, it is known that this condition prevails when the two resistance parameters in the separate arms are equal to a quantity R and the inductance and capacitance parameters are so made that $$\sqrt{\frac{L}{C}}$$

is equal to the quantity R. The above-mentioned equivalent impedance is also equal to R at all frequencies. The input circuit is the equivalent of the resistor and capacitor in series and that can be made one branch of the combination. The other branch of the combination is provided by inductor 107 and resistor 26' in series. It is fortuitous that the resistor values of 26' and 34 are usually of nearly equal value. Thus, in effect, we have added a sync separator load with its attendant capacity without in any way disturbing the performance of the video amplifier alone. Suitable parameters for the Fig. 4 circuit are:

| | |
|---|---|
| Tube **32** | 6AU6. |
| Inductor **107** | 920 microhenries. |
| Capacitor $C_D$ | 20 micromicrofarads including distributed capacity. |
| Resistor **26'** | 6800 ohms. |
| Resistor **34** | 6800 ohms. |
| Other parameters as in Fig. 1. | |

Figure 5:
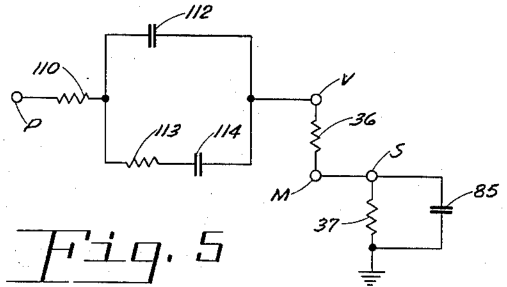
Fig. 5 is a circuit schematic of an alternative form of grid coupling circuit which may be used in conjunction with the invention.

In Fig. 5 there is illustrated a sync separator charging circuit which may be substituted for the elements 34 and 35 (between terminals P and V) in Fig. 1. The Fig. 5 circuitry is disclosed and claimed in U. S. Patent 2,651,675 to Wissel. This circuit comprises a resistor 110 in series with a two-branch circuit, one branch of which comprises a relatively small capacitor 112 and the other branch of which comprises a series combination of a resistor 113 and a relatively large capacitor 114. This circuit enables us to more nearly reconcile the conflicting requirements of enhanced noise immunity and efficient synchronizing signal separation.

A discussion of the usual conventional sync separator charging circuit will make clear the advantages of the charging circuit illustrated in Fig. 5. The conventional charging circuit involves a single relatively large capacitor in place of the network 112, 113 and 114. This usual condenser can absorb a relatively large amount of energy from high amplitude noise pulses. When it becomes charged to a level above the normal sync pulse amplitude level, the long discharge or recovery time keeps the following tube effectively blocked for many succeeding horizontal synchronizing pulses. During this period of time effective sync separation does not take place. If the usual sync capacitor is made small enough to discharge quickly (that is, given a time constant on the order of line-frequency), synchronizing signal separation is impaired, because the capacitor discharges during the interval between lines and permits video and pedestal components to affect the cathode current. Additionally, due to the variation of the charge voltage, the effective direct current developed is reduced. This grid current is a measure of grid rectification efficiency and accordingly a single small capacitor causes such efficiency to be reduced. The efficiency then is increased during the vertical sync period, due to the larger duty cycle, and thus the amplitude of the separated synchronizing pulses varies during a vertical sync interval.

The circuit illustrated in Fig. 5 recognizes the relatively constant amplitude of the received television signal (without noise interference) and the timing and duty cycles of the horizontal and vertical synchronizing pulses. Capacitor 112 is made small, so that it does not store any more energy than is necessary to acquire a sufficient charge during each horizontal synchronizing pulse. The primary discharge path of capacitor 112 is through the time constant circuit comprising resistor 113 and capacitor 114. Energy is stored in capacitor 114 primarily by reason of the discharge of capacitor 112 and the main charge of the system is stored in capacitor 114. Capacitor 114 in effect maintains the average level and capacitor 112 provides for small variations. Since capacitor 114 cannot be quickly charged during a vertical pulse (due to the relatively large value of resistor 113), the time constant of its discharge path which is the product of parameters 114 and 36 (elements 37 and 85 being low enough in impedance so as not to affect this discharge current appreciably) can be made relatively short. This makes practical the use of a capacitor 114 smaller in value than the single one heretofore used for charging purposes.

The time constant for the primary charged path for capacitor 112 (i. e., resistor 110, capacitor 112, and the cathode-grid resistance of tube 32) is made on the order of the horizontal synchronizing pulse duration (five microseconds). The discharge time constant into capacitor 114 (dependent on the product of the values of capacitor 112 and resistor 113) is on the order of the period between the initiation of each line (approximately 60 microseconds) and the discharge time constant for capacitor 114 (the product of the value of capacitor 114 and the sum of resistance values: resistor 110, resistor 113, and resistor 36) approximates the duration of one field (one-sixtieth second).

Suitable parameters are as follows:

| | | |
|---|---|---|
| Capacitor **112** | microfarads | 0.001 |
| Resistor **110** | ohms | 6800 |
| Resistor **113** | do | 47,000 |
| Capacitor **114** | microfarads | 0.02 |
| Resistor **36** | ohms | 560,000 |

This circuit functions effectively in recognizing the level of the television synchronizing pulses which are relatively constant in amplitude and continually recurring and discriminating against occasional higher amplitude and longer pulses of noise which would give false information to other circuits of similar efficiency.

Figure 6:
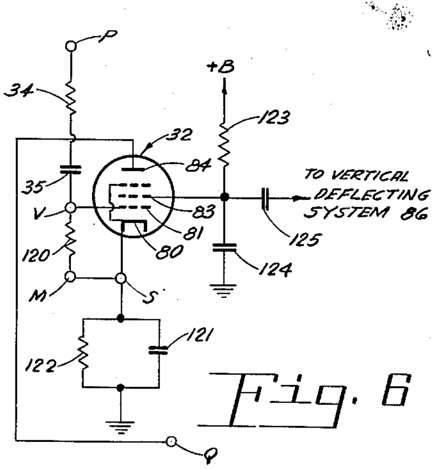
Fig. 6 shows a modified form of control circuit in accordance with the invention in which screen current pulses rather than cathode current pulses are integrated for purposes of vertical synchronizing signal stripping.

Referring now to the embodiment of the invention specifically disclosed in Fig. 6, there is illustrated an alternative form of the invention in which screen grid pulses are integrated to form the stripped vertical synchronizing pulses. It has been observed that in the Fig. 1 system the final step in the development of stripped vertical synchronizing pulses (i. e., the pulses applied to the vertical deflecting system 86) is integration of the cathode current pulses which are generated during the peaks of the synchronizing signal voltages applied to the control electrode 81. It has also been pointed out that the cathode current flow in tube 32 includes as its major portion the space current as defined in column 6, lines 59–62, and also grid current, which current is relatively small as to total energy content with respect to space current. In the Fig. 1 embodiment the stripped vertical pulses are formed by integration of cathode current, but the essential feature is that they be formed by integration of at least a part of the space current and they need not necessarily be formed by the space current plus the control grid current. They may also be formed by integration of screen current, which is a part of the space current as defined in column 6, lines 66–68. The Fig. 6 embodiment shows how this may be done. The input circuit of the Fig. 6 embodiment is substantially the same as in Fig. 1, there being provided a grid resistor 120 between terminals V and M, and input coupling capacitor 35 and series grid resistor 34. It will be understood that the plate circuit connections for the Fig. 6 embodiment are precisely the same as those illustrated in Fig. 1. However, the cathode by-pass capacitor 121 in accordance with Fig. 6 truly functions as a by-pass and is considerably larger than capacitor 85 (Fig. 1). Further, the cathode resistor 122 in Fig. 6 is provided as a bias resistor simply in order to prevent overloading the tube 32 in the absence of any signals whatever. In the Fig. 6 embodiment the elements 121, 122 are simply an overload prevention and by-pass arrangement, and they do not function as an integrating network for the formation of the vertical sync pulses. The screen 83 is connected to an appropriate source of screen potential (the positive terminal of which is indicated by the symbol +B) by a screen dropping resistor 123. A capacitor 124 is connected between ground and the junction of screen grid 83 and resistor 123 in order to integrate the screen grid current pulses which flow during the peaks of the applied synchronizing signals. The junction of resistor 123 and capacitor 124 is coupled to the vertical deflecting system as by a coupling capacitor 125, so that the vertical deflecting system is directly triggered by the stripped vertical synchronizing pulse output from capacitor 124, which as indicated integrates screen current pulses to provide the stripped vertical synchronizing pulses. The following illustrative parameters are suitable:

| | | |
|---|---|---|
| Resistor **120** | ohms | 560,000 |
| Resistor **123** | do | 10,000 |
| Resistor **122** | do | 1000 |
| Capacitor **121** | microfarads | 4 |
| Capacitor **124** | do | 0.02 |

Like reference numerals are employed throughout to designate like circuit elements, and reference numerals primed are employed to designate circuit elements which are generally similar to those illustrated in Fig. 1. Therefore, the Fig. 7 embodiment and the other alternative forms of the invention illustrated herein need not be discussed in detail, but only in the respects wherein they depart from Fig. 1. Referring now further to Fig. 7, there is shown an embodiment of the invention in which the plate 84 is not keyed for the purpose of developing the plate circuit output pulses, but in which the suppressor electrode 94 is employed for the purpose of diverting screen current to the plate circuit and in that manner causing the plate pulses to be developed. In this embodiment terminal Z is grounded and terminal Q is connected to the suppressor electrode, the latter being disconnected from the cathode. Winding 38, which applies keying pulses to suppressor electrode 94, is connected between terminals Q and Z, i. e., between suppressor and ground. The integrating circuit 87, 88 is connected between anode 84 and ground, terminal W (and not Q) being connected to the anode. The cathode and grid circuits are as shown in Fig. 1. In the Fig. 7 embodiment the output plate pulses are produced by suppressor-electrode keying as distinguished from anode-keying.

In Fig. 8 there is shown a modified form of integrating circuit suitable for inclusion in the Fig. 1 embodiment. Between terminals S and T are placed two parallel combinations, one comprising resistor 132 and capacitor 134, the other comprising resistor 135 and capacitor 136. This circuit has a significant advantage in that it provides a relatively large degenerative cathode bias during the periods of the vertical sync pulses, thereby rendering the tube less sensitive to the coupling of vertical signal information into the horizontal AFC system, which coupling is inherent in all pulse width control systems. Suitable parameters are:

| | | |
|---|---|---|
| Resistor **132** | ohms | 4700 |
| Capacitor **134** | microfarads | 0.025 |
| Resistor **135** | ohms | 1000 |
| Capacitor **136** | microfarads | 0.1 |

Since the vertical sync pulse output is taken off at the junction of the two networks, this cathode bias is made large and at the same time the stripped vertical pulse amplitude is not rendered excessive.

While there have been shown and described what are at present considered to be the preferred embodiments of the present invention, it will be obvious to those skilled in the art that various changes and modifications may be made within the teachings of the invention and the true scope of the appended claims. For example, a beam tube such as a beam power tetrode may be substituted for the pentode tube herein illustratively shown, particularly in the Fig. 1 and other embodiments in which the plate circuit is keyed.

Having fully disclosed our invention, we claim:

1. In a television receiver of the type which includes a source of negative phase picture signals including video components and positive-polarity horizontal and vertical synchronizing pulse components, a directly triggered vertical deflecting system and an indirectly synchronized horizontal deflecting system of the type which has an oscillator devise controlled by a unidirectional frequency-control potential, a circuit for separating synchronizing pulses from the composite signals and for applying stripped vertical triggering pulses to the vertical system and the unidirectional control potential to the horizontal system, comprising, in combination: an electronic tube having at least a cathode, a control electrode, a screen grid and an anode, means for applying said picture signals to the control electrode circuit of said tube including grid-biasing means for confining cathode-current conductivity of said tube during broadcast reception to the periods of said synchronizing pulses, an integrating circuit comprising a parallel combination of a resistor and a capacitor in the cathode circuit of said tube for stripping the vertical triggering pulses from the composite signals by integration of cathode current, said grid-biasing means including a resistor connected between said control electrode and said cathode, means for applying said vertical triggering pulses to the vertical deflecting system, means for supplying potential to the screen to cooperate with the grid bias to cause cathode current to flow only during the application of said synchronizing pulses to said control electrode and in an amount substantially independent of applied anode voltage, keying means coupled to the horizontal deflecting system and in circuit with said anode for applying positive retrace pulses to the anode of said tube to produce pulses of plate current by diversion of some of the cathode current from screen to anode during periods of coincidence between said retrace pulses and the horizontal synchronizing components of said picture signals, means in series with said anode for integrating said plate-current pulses into said desired unidirectional control potential, and means comprising a direct conductive connection from said integrating means to said oscillator device for applying said control potential to said oscillator in said horizontal deflecting system.

2. In a television receiver of the type which includes a source of negative phase picture signals including video components and positive-polarity horizontal and vertical synchronizing pulse components, a directly triggered vertical deflecting system and an indirectly synchronized horizontal deflecting system of the type which has an oscillator controlled by a unidirectional frequency-control potential, a circuit for separating synchronizing pulses from the composite signals and for applying stripped vertical triggering pulses to the vertical system and the unidirectional control potential to the horizontal system, comprising, in combination: an electronic tube having at least a cathode, a control electrode, a screen grid and an anode, means for applying said picture signals to the control electrode circuit of said tube comprising grid-biasing means including a resistor connected between said cathode and control electrode for confining cathode current conductivity of said tube during broadcast reception to the periods of said synchronizing pulses, means in the cathode circuit of said tube for stripping the vertical triggering pulses by integration of cathode current, means for applying said vertical triggering pulses to the vertical deflecting system, means for supplying such potential to the screen that cathode current flows only during the application of said synchronizing pulses to said control electrode and in an amount substantially independent of applied anode voltage, keying means coupled to the horizontal deflecting system and in circuit with said anode for applying positive horizontal deflection-rate pulses to the anode of said tube to produce pulses of plate current by diversion of some of the cathode current from screen to anode during periods of coincidence between said retrace pulses and the horizontal synchronizing components of said picture signals, means in series with said anode for integrating said plate-current pulses into said desired unidirectional control potential, and means comprising a direct conductive connection from said integrating means to said oscillator for applying said control potential to said oscillator in said horizontal deflecting system.

3. In a television receiver of the type which includes a source of negative phase picture signals including video components and positive-polarity horizontal and vertical synchronizing pulse components, a directly triggered vertical deflecting system and an indirectly synchronized horizontal deflecting system of the type which has an oscillator controlled by a unidirectional frequency-control potential, a circuit for separating synchronizing pulses from the composite signals and for applying stripped vertical triggering pulses to the vertical system and the unidirectional control potential to the horizontal system, comprising, in combination: an electronic tube providing two space-current paths and having at least a cathode, a control electrode, a screen and an outer electrode, means for applying said composite signals to the control electrode circuit of said tube comprising grid-biasing means including a resistor connected between said cathode and control electrode for confining space current conductivity of said tube during broadcast reception to the periods of said synchronizing pulses, means comprising a parallel combination of resistance and capacitance in a space current path and in series with the cathode for stripping the vertical triggering pulses from the composite signals by integration of at least a part of said space current, means for applying said vertical triggering pulses to the vertical deflecting system, means for supplying such potential to said screen that space current flows in only one of said paths during the application of said synchronizing pulses to said control electrode in an amount substantially independent of applied anode voltage, keying means coupled to the horizontal deflecting system for applying positive retrace pulses to said outer electrode to produce pulses of current in said other path by diversion of some of the space current from said screen during periods of coincidence between said retrace pulses and the horizontal synchronizing components of said picture signals, means in series with said outer electrode for integrating said pulses in said other path into said desired unidirectional control potential, and means comprising a direct conductive connection from said integrating means to said oscillator for applying said control potential to said oscillator in said horizontal deflecting system.

4. In a television receiver of the type which includes a source of negative phase picture signals comprising video components and horizontal and vertical synchronizing signal components and a horizontal deflecting system providing a source of positive horizontal flyback pulses, the improvement which comprises the following, in combination: a pentode or beam tube having a cathode, a control grid, a screen grid, and an anode, means for applying said picture signals to the control electrode circuit including self-biasing means having a resistor connected between said control electrode and cathode and constituting with said cathode and control grid a grid circuit sync clipper which allows grid current to flow only during the peaks of the synchronizing components and confines cathode current to the periods of said synchronizing components, means in the cathode circuit for deriving stripped vertical synchronizing pulses from recurrent bursts of cathode current, means connected to said anode for applying said fly-back pulses to the anode-cathode circuit of said tube whereby said tube generates periodic anode pulses by diversion of cathode current from said screen to said anode, the width of which varies with the phase difference between said flyback pulses and said horizontal synchronizing components, means for so positively biasing said screen that said cathode current is substantially independent of said flyback pulses, means in circuit with said anode for integrating said anode pulses into a unidirectional horizontal frequency-control potential, and means comprising a direct conductive connection from said integrating means to said deflecting system for applying said control potential to said horizontal deflecting system.

5. In a television receiver of the type which includes a source of negative phase picture signals comprising video components and horizontal and vertical synchronizing signal components and a horizontal deflecting system providing a source of positive horizontal flyback pulses, the improvement which comprises the following, in combination: a pentode or beam tube having a cathode, a control grid, a screen grid, and an anode, means for applying said picture signals to the control electrode circuit including self-biasing means having a resistor connected between said control electrode and cathode and constituting with said cathode and control grid a grid circuit sync clipper which allows grid current to flow only during the peaks of the synchronizing components and confines space current flow to the periods of said synchronizing components, means comprising a parallel combination of resistance and capacitance in series with the cathode for deriving stripped vertical synchronizing pulses from recurrent bursts of space current, means connected to said anode for applying said flyback pulses to the anode-cathode circuit of said tube whereby said tube generates periodic anode pulses by diversion of space current from said screen to said anode during intervals of coincidence between flyback and synchronizing pulses, the width of said anode pulses varying with the phase difference between said flyback pulses and said horizontal synchronizing components, means for so positively biasing said screen that said space current is substantially independent of said flyback pulses, means in circuit with said anode for integrating said anode pulses into a unidirectional horizontal frequency-control potential, and means comprising a direct conductive connection from said integrating means to said deflecting system for applying said control potential to said horizontal deflecting system.

References Cited in the file of this patent

UNITED STATES PATENTS

| | | |
|---|---|---|
| 2,176,663 | Browne et al. | Oct. 17, 1939 |
| 2,227,056 | Blumlein et al. | Dec. 31, 1940 |
| 2,227,066 | Cork et al. | Dec. 31, 1940 |
| 2,230,295 | Holmes | Feb. 4, 1941 |
| 2,293,528 | Barco et al. | Aug. 18, 1942 |
| 2,307,375 | Blumlein et al. | Jan. 5, 1943 |
| 2,307,387 | Blumlein | Jan. 5, 1943 |
| 2,411,695 | Rade | Nov. 26, 1946 |
| 2,559,038 | Bass | July 3, 1951 |
| 2,585,929 | Gruen | Feb. 19, 1952 |
| 2,585,930 | Gruen | Feb. 19, 1952 |
| 2,601,415 | Oliver | June 24, 1952 |
| 2,656,414 | Roschke et al. | Oct. 20, 1953 |

FOREIGN PATENTS

| | | |
|---|---|---|
| 845,897 | France | Sept. 4, 1939 |